US005903340A

United States Patent [19]

Lawandy et al.

[11] Patent Number: 5,903,340

[45] **Date of Patent: *May 11, 1999**

[54] OPTICALLY-BASED METHODS AND APPARATUS FOR PERFORMING DOCUMENT AUTHENTICATION

[75] Inventors: Nabil M Lawandy, North Kingston; Timothy J Driscoll, Providence, both of R.I.

[73] Assignee: Brown University Research Foundation, Providence, R.I.

[ * ] Notice: This patent is subject to a terminal disclaimer.

[21] Appl. No.: 08/835,655

[22] Filed: Apr. 10, 1997

Related U.S. Application Data

[60] Continuation-in-part of application No. 08/401,356, Mar. 9, 1995, Pat. No. 5,625,456, which is a division of application No. 08/210,710, Mar. 18, 1994, Pat. No. 5,448,582.

[51] Int. Cl.[6] .......... G06K 9/74

[52] U.S. Cl. .......... 356/71

[58] Field of Search .......... 356/71

[56] References Cited

U.S. PATENT DOCUMENTS

| | | | |
|---|---|---|---|
| 4,437,935 | 3/1984 | Crane, Jr. | 162/103 |
| 4,533,244 | 8/1985 | Kaule et al. | 356/71 |
| 4,534,398 | 8/1985 | Crane | 162/103 |
| 5,486,022 | 1/1996 | Crane | 283/83 |
| 5,625,456 | 4/1997 | Lawandy | 356/376 |

OTHER PUBLICATIONS

"Photonic textile fibers", R. M. Balachandran et al., Applied Optics, Apr. 20, 1996, vol. 35, No. 12, pp. 1991–1994.

"The Efficient Use of Fluorescent WhiteningAgents in the Paper Industry", Clifford C. Roltsch et al., TAPPI Proceedings, Papermakers Conference, May 1987, pp. 87–99.

*Primary Examiner*—Robert H. Kim
*Attorney, Agent, or Firm*—Perman & Green, LLP

[57] ABSTRACT

This invention teaches a method for authenticating a document. The method includes the steps of: (a) providing a document to be authenticated; (b) illuminating at least a portion of the document with laser light that exceeds a threshold fluence; (c) detecting a narrow band laser-like emission of at least one wavelength from the document in response to the step of illuminating; and (d) declaring the document to be authentic only if the laser-like emission is detected.

41 Claims, 4 Drawing Sheets

OPTICALLY-BASED METHODS AND APPARATUS FOR PERFORMING DOCUMENT AUTHENTICATION

CROSS-REFERENCE TO A RELATED PATENT APPLICATION

This patent application is a continuation-in-part of related U.S. patent application Ser. No.: 08/401,356, filed Mar. 9, 1995, now U.S. Pat. No. : 5,625,456, issued Apr. 29, 1997, which is a divisional patent application of U.S. patent application Ser. No.: 08/210,710, filed Mar. 18, 1994, entitled "Optical Sources Having a Strongly Scattering Gain Medium Providing Laser-Like Action", by Nabil M. Lawandy, now U.S. Pat. No. : 5,448,582, issued Sep. 5, 1995.

FIELD OF THE INVENTION

This invention relates generally to optically-based methods and apparatus for determining and validating the authenticity of currency, checks, negotiable instruments, and other types of document.

BACKGROUND OF THE INVENTION

In U.S. Pat. No. 5,448,582, issued Sep. 5, 1995, entitled "Optical Sources Having a Strongly Scattering Gain Medium Providing Laser-Like Action", the inventor disclosed a multi-phase gain medium including an emission phase (such as dye molecules) and a scattering phase (such as $TiO_2$). A third, matrix phase may also be provided in some embodiments. Suitable materials for the matrix phase include solvents, glasses and polymers. The gain medium is shown to provide a laser-like spectral linewidth collapse above a certain pump pulse energy. The gain medium is disclosed to be suitable for encoding objects with multiple-wavelength codes, and to be suitable for use with a number of substrate materials, including polymers and textiles.

It is well known in the art to use security threads in paper to hinder a non-authorized production of the paper or to authenticate already manufactured paper and/or a document or currency printed on the paper. Reference in this regard can be had to the following U.S. Pat. Nos.: 5,486,022, "Security Threads Having At Least Two Security Detection Features and Security Papers Employing Same", by T. T. Crane; 4,534,398, "Security Paper", by T. T. Crane; and 4,437,935, "Method and Apparatus for Providing Security Features in Paper", by F. G. Crane, Jr.

A problem currently exists in accurately authenticating certain documents, such as currency, bank drafts, stock certificates, bonds, checks, and negotiable instruments in general. It is widely known that modern counterfeiters have access to sophisticated technology, and can reproduce nearly indistinguishable copies of currency and other documents. As a result, it has become very difficult to unambiguously authenticate a given document.

OBJECTS OF THE INVENTION

It is thus a first object of this invention to provide an improved method and apparatus for authenticating documents.

It is a further object of this invention to provide improved optically-based methods and apparatus for authenticating documents.

It is another object of this invention to provide a document or document substrate, such as paper, that is printed or constructed so as enable the document to be accurately and unambiguously authenticated as being genuine.

SUMMARY OF THE INVENTION

The foregoing and other problems are overcome and the objects of the invention are realized by methods and apparatus in accordance with embodiments of this invention.

In a first aspect this invention teaches a method for authenticating a document. The method includes the steps of: (a) providing a document to be authenticated; (b) illuminating at least a portion of the document with laser light that exceeds a threshold fluence; (c) detecting a narrow band laser-like emission of at least one wavelength from the document in response to the step of illuminating; and (d) declaring the document to be authentic only if the laser-like emission is detected.

In one embodiment the document has embedded threads, individual ones of which comprise a substrate material and an optical gain medium in combination with scatterers for providing the laser-like emission in response to the step of illuminating. In another embodiment the document has an ink bearing surface, the ink including the optical gain medium in combination with scatterers for providing the laser-like emission in response to the step of illuminating. In another embodiment the document has a fluorescent whitening agent (FWA), and the FWA functions as the optical gain medium in combination with scatterers for providing the laser-like emission in response to the step of illuminating. In a further embodiment the document has embedded threads, such as multi-layered security threads and/or textile threads or filaments, individual ones of which are impregnated and/or coated with an aqueous-based polymer coating. In this embodiment the polymer coating functions as an optical gain medium in combination with scatterers for providing the laser-like emission in response to the step of illuminating. In a further embodiment embedded threads are each comprised of N filaments, each of which comprise a substrate material and an optical gain medium in combination with scatterers for providing the laser-like emission in response to the step of illuminating. In this case each thread emits light at N distinguishable wavelengths. In a further embodiment each of the threads is comprised of a multilayered structure having at least one layer comprised of the optical gain material, and an underlying reflector layer. In this case the at least one layer of optical gain material can be differentiated into a plurality of regions, each of the regions emitting with a characteristic wavelength. The underlying reflector layer can be patterned, and can further be used to modulate a thickness of an overlying layer comprised of the optical gain material.

In a still further embodiment of this invention the step of detecting detects a presence of a secondary emission peak that results from a photoconversion of a primary emission peak.

Also disclosed is an optical authentication apparatus for detecting one or more emissions having characteristic wavelengths, and for declaring a document to be genuine only if the expected wavelengths are present and have expected intensities.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

The disclosure of the above-referenced U.S. Pat. No. 5,448,582, issued Sep. 5, 1995, entitled "Optical Sources Having a Strongly Scattering Gain Medium Providing Laser-Like Action", by Nabil M. Lawandy is incorporated by reference herein in its entirety. Also incorporated by reference herein in its entirety is the disclosure of U.S. Pat. No. 5,434,878, issued Jul. 18, 1995, entitled "Optical Gain Medium Having Doped Nanocrystals of Semiconductors and also Optical Scatterers", by Nabil M. Lawandy.

This invention employs an optical gain medium that is capable of exhibiting laser-like activity when excited by a source of excitation energy, as disclosed in the above-referenced U.S. patents. The optical gain medium is comprised of: a matrix phase, for example a polymer or solvent, that is substantially transparent at wavelengths of interest; an electromagnetic radiation emitting and amplifying phase, for example a chromic dye or a phosphor; and a high index of refraction contrast electromagnetic radiation scattering phase, such as particles of an oxide and/or scattering centers within the matrix phase.

This invention employs the discovery by the inventor that a dye or some other material capable of emitting light, in combination with scattering particles or sites, exhibits electro-optic properties consistent with laser action; i.e., a laser-like emission that exhibits both a spectral linewidth collapse and a temporal collapse at an input pump energy above a threshold level.

The invention is applied herein to the validation of the authenticity of documents, currency, checks, lottery tickets, and other similar instruments that are typically provided on paper or a paper-containing or paper-like substrate.

The invention enables both public validation, e.g., by visual inspection, and machine-based validation, e.g., with the use of an optical source and one or more suitable optical detectors. Thus, two levels of authentication can be used.

Figure 1:
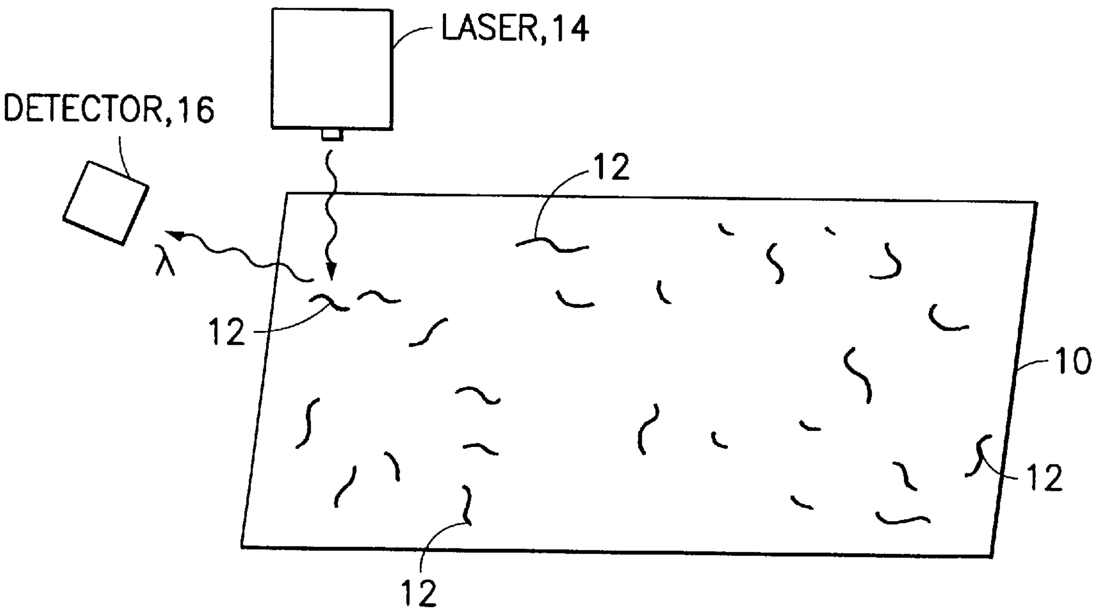
FIG. 1 illustrates a document having embedded fibers or threads that emit laser-like light, when exited by an optical source such as a laser, at one or more characteristic wavelengths.

FIG. 1 illustrates a first embodiment of this invention. A document, including any paper, paper-containing, or polymer substrate 10, includes a plurality of embedded elongated bodies or threads 12 that include a host material, such as a textile fiber or a polymer fiber, that is coated or impregnated with a chromic dye or some other material capable of emitting light, such as a phosphor, in combination with scattering particles (e.g., $TiO_2$ particles) or scattering sites. The threads 12 exhibit electro-optic properties consistent with laser action; i.e., an output emission that exhibits both a spectral linewidth collapse and a temporal collapse at an input pump energy above a threshold level, as described in U.S. Pat. No. 5,448,582. In response to illumination with laser light, such as frequency doubled light (i.e., 532 nm) from a Nd:YAG laser 14, the threads 12 emit a wavelength $\lambda$ that is characteristic of the chromic dye or other material that comprises the illuminated threads 12. An optical detector 14, which may include a wavelength selective filter, can be used to detect the emission at the wavelength $\lambda$. The emission may also be detected visually, assuming that it lies within the visible portion of the spectrum. In either case, the detection of the emission at the characteristic wavelength $\lambda$ indicates that the document is an authentic document, i.e., one printed on the substrate 10 having the threads 12. It is assumed that only authentic documents are printed on such substrates, and that one wishing to fraudulently produce such a document would not have access to the substrate material. Currency is one specific example.

In a further embodiment the threads 12 contain only the gain medium, such as a chromic dye or a phosphor, and the scattering phase is embodied in the surrounding matrix of the substrate 10. A reflective coating can be applied so as to enhance the emission from the threads 12.

Figure 7:
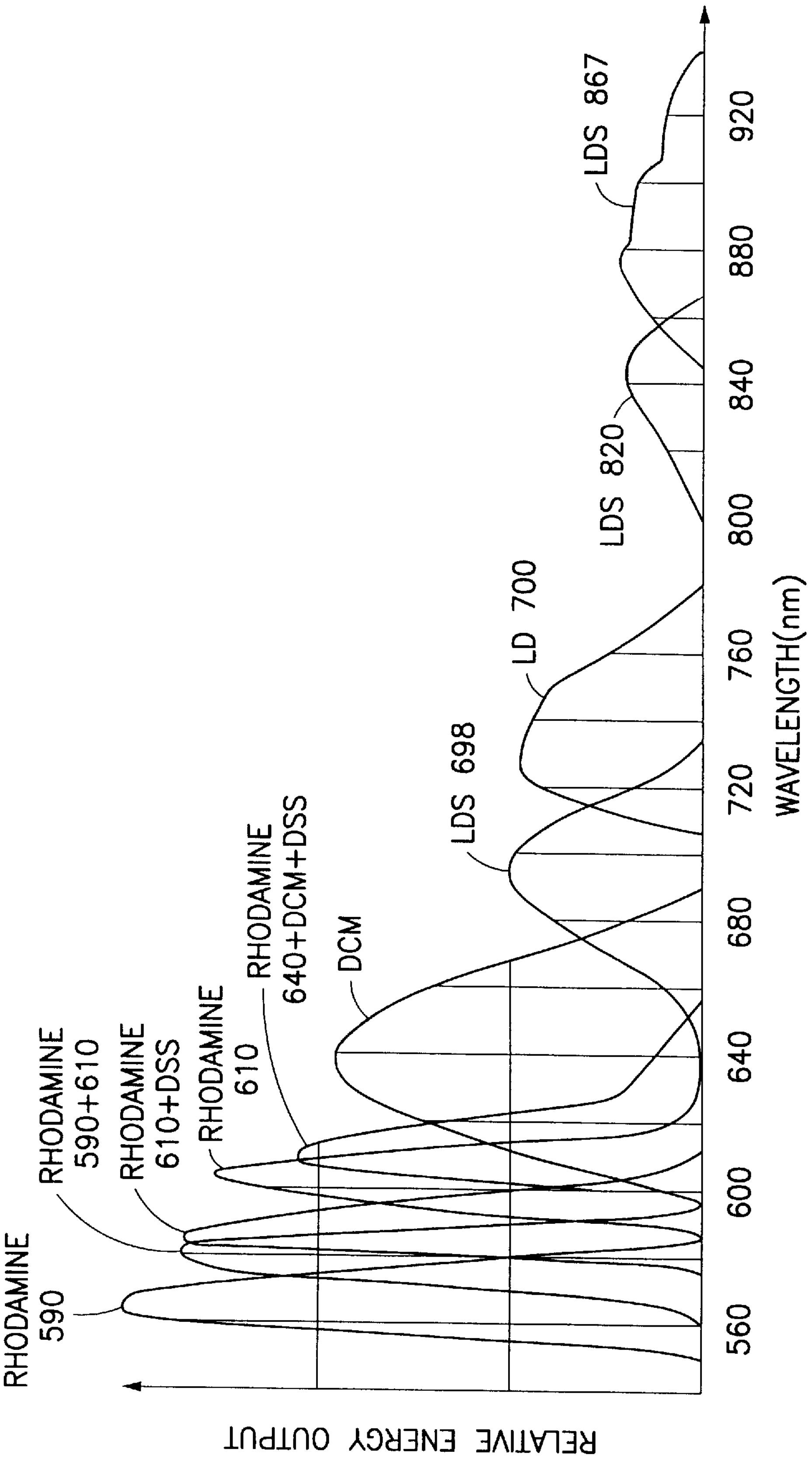
FIG. 7 is a graph that illustrates a number of suitable dyes that can be used to form the gain medium in accordance with this invention.

FIG. 7 illustrates a number of exemplary dyes that are suitable for practicing this invention, and shows their relative energy output as a function of wavelength. The teaching of this invention is not limited for use with only the dyes listed in FIG. 7.

Figure 2:
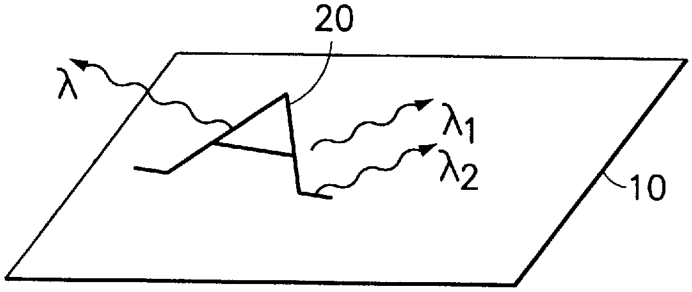
FIG. 2 illustrates a portion of a document that is printed with an indicia that emits laser-like light, when excited by an optical source such as a laser, at one or more characteristic wavelengths.

Referring to FIG. 2, in a further embodiment of this invention the gain medium can be provided in fluid form and intaglio printed onto the substrate 10. The resulting indicia 20, when illuminated by the laser 14, emits the light having the wavelength $\lambda$. This is also clearly a case of a public and a machine readable validation of the authenticity of the document.

Further in accordance with this embodiment a two layer printing operation can be performed, wherein a bottom layer has a gain medium that emits at $\lambda_1$, and a top layer that has a gain medium that emits at $\lambda_2$. In this manner two distinct optical signatures are emitted after excitation. Also, the lower layer of gain medium can emit at a wavelength that excites and pumps the gain medium of the upper layer. Preferably, the upper layer has a thickness that is sufficient to render the lower layer invisible to the naked eye, but is thin enough to allow the emission at $\lambda_1$ to be observed. A suitable thickness for the upper layer is in the range of about 10 micrometers to about 20 micrometers.

In the embodiment of FIG. 2 the indicia can be formed from only the gain medium (e.g., one or more selected dye molecules or phosphors suspended in a solvent), and the scattering phase can be scattering sites in the underlying substrate 12, such as scattering sites in a paper matrix on which the indicia is intaglio printed. Alternatively, scattering particles, such as $TiO_2$, can be mixed with the gain medium.

Figure 5:
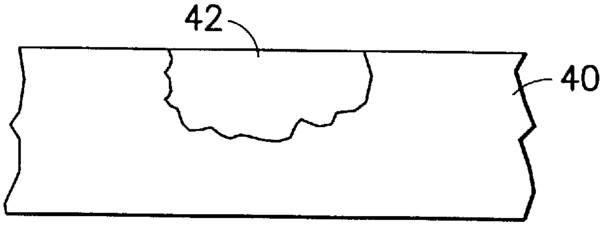
FIG. 5 is an enlarged, cross-sectional view of a paper substrate that includes a region comprised of an optical gain medium.

FIG. 5 is an enlarged cross-sectional view of a paper substrate 40 having a region 42 impregnated with ink and the selected gain medium. In this embodiment the scattering phase can be the microstructure of the paper itself, either alone or in combination with conventional paper and/or ink additives, such as titania or calcium carbonate which may be added by the ink manufacturer. If the gain medium is a dye, then the dye should be soluble in the ink. A further consideration is that any pigments in the ink should not be strongly absorbing at the wavelength of the laser 12 or at the emission wavelength of the dye. The pigment particles may also function as the scattering phase for the gain medium.

Suitable ink types include any mineral oil or polymer-based inks. All inks consist of a binder and a solvent to dissolve the pigment and make the ink printable. By example, newspaper ink includes mineral oil and carbon black. In this case the mineral oil serves as both the solvent and the binder. Examples of polymer-based inks include heat or UV-curable inks. In these systems the binder is the polymer which is activated by heat or light. This serves to remove the solvent and to cause the polymer to cross link, making it adhere to the substrate.

Further in accordance with an aspect of this invention, it has been discovered by the inventors that certain paper brightening or fluorescent whitening agents (FWAs) can form the narrow laser-like emission, when suitably pumped by the laser 12. In this case it is believed that the microstructure of the paper itself functions as scattering sites. Reference with regard to suitable FWAs, in particular Stilbenic FWAs, can be made to a publication entitled "The Efficient Use of Fluorescent Whitening Agents in the Paper Industry", C. C. Roltsch et al., 1987 Papermakers Conference, May, 1987, 87–99. A suitable pump wavelength for exciting the FWAs is in the range of about 350 nm to about 400 nm, and a suitable power is about 5 mJ/cm$^2$.

While Stilbenic dyes can be used, in some applications their tendency to degrade may be undesirable. It may thus be preferred to use azoals which emit at about 420 nm to about 440 nm. The absorption of $TiO_2$ in this range should thus also be considered.

Figure 3:
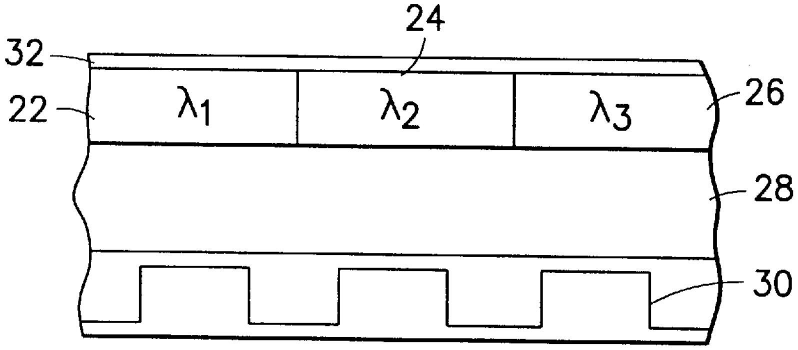
FIG. 3 is an enlarged, cross-sectional view of a structure that is suitable for forming the document threads shown in FIG. 1.

FIG. 3 illustrates an embodiment of a structure wherein a one or more regions (e.g. three) 22, 24, 26 each include, by example, a dye in combination with scattering phosphors, or phosphors which function both as the gain medium and the scattering sites, that are selected for providing a desired wavelength $\lambda_1$, $\lambda_2$, $\lambda_3$. An underlying substrate, such as a thin transparent polymer layer 28, overlies a reflective layer 30. The reflective layer 30 can be a thin layer of metal foil, and may be corrugated or otherwise shaped or patterned as desired. The structure can be cut into thin strips which can be used to form the threads 12 shown in FIG. 1. Under low level illumination provided by, for example, a UV lamp a public authentication can be provided based on a characteristic broad band fluorescent emission (e.g., some tens of nanometers or greater) of the dye or phosphor particles. However, when excited by the laser 14 the structure emits a characteristic narrow band emission (e.g., less than about 10 nm) at each of the wavelengths $\lambda_1$, $\lambda_2$, $\lambda_3$. The presence of these three wavelengths can be detected with the detector or detectors 16, in combination with suitable optical passband filters, thereby providing also a machine readable authentication of the document containing the structure.

If desired, a suitable coating 32 can be applied to the regions 22, 24 and 26. The coating 32 can provide UV stability and/or protection from abrasive forces. A thin transparent UV absorbing polymer coating is one suitable example, as are dyes, pigments and phosphors.

For the case where the coating 32 is applied, the coating can be selected to be or contain a fluorescent material. In this case the coating 32 can be excited with a UV source to provide the public authentication function.

Further in accordance with an aspect of this invention, the inventors have determined that an aqueous-based polymer coating, such as a varnish, can be made to exhibit a laser-like emission in the range of about 560 nm to about 650 nm when excited by 532 nm light above a predetermined threshold fluence of about 5 mJ/cm$^2$. A laser-like emission can also be obtained in the range of about 420 nm to about 480 nm when excited by light having wavelengths between 330 nm and 400 nm.

Figure 6:
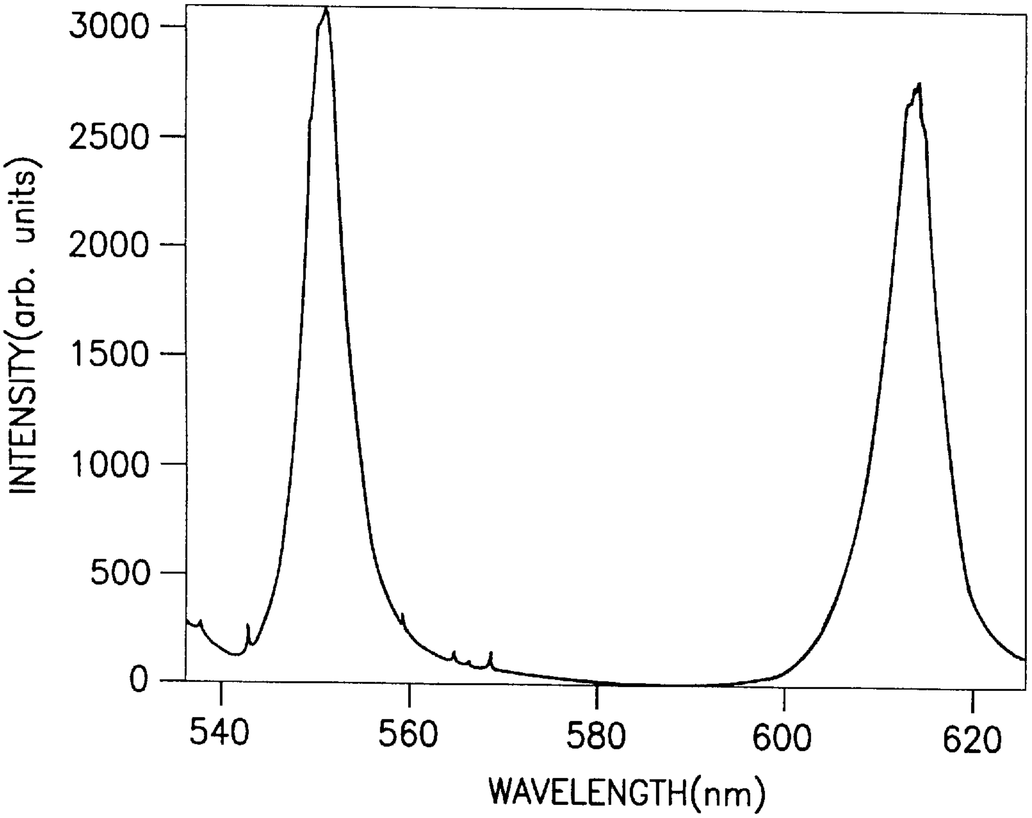
FIG. 6 shows characteristic emission peaks for a thread comprised of a plurality of constituent polymeric fibers, each of which emits at a characteristic wavelength.

The threads 12 may be comprised of fibers such as nylon-6, nylon 6/6, PET, ABS, SAN, and PPS. By example, a selected dye may be selected from Pyrromethene 567, Rhodamine 590 chloride, and Rhodamine 640 perchlorate. The selected dye and scattering particles, such as $TiO_2$, are compounded with a selected polymer resin and then extruded. Wet spinning is another suitable technique for forming the fibers. A suitable dye concentration is $2\times10^{-3}$ M, and a suitable scatterer concentration is approximately $10^{11}$/cm$^3$. Extrusion at 250° C. followed by cooling in a water bath is one suitable technique for forming the fibers 12, which may have a diameter of about 200 micrometers. When used in a paper substrate the diameter is sized accordingly. A suitable excitation (pump 12) fluence is in the range about 5 mJ/cm$^2$ and greater. Two or more fibers, each containing a different dye, can be braided together or otherwise connected to provide a composite fiber that exhibits emission at two or more wavelengths. By example, FIG. 6 illustrates the emission from a braided pair of nylon fibers, excited at the 532 nm line of a frequency doubled Nd:YAG laser 12, containing $2\times10^{-3}$ M Pyrromethene 567 and Rhodamine 640 perchlorate and approximately $10^{11}$/cm$^3$ $TiO_2$ scatterers, with emission peaks at 552 nm and 615 nm, respectively. By varying the dye-doped fiber types in various combinations of braided or otherwise combined fibers, the resulting composite fibers or threads 12 make it possible to optically encode information into the paper or other host material. By example, currency can be encoded with its denomination by the selection of thread emission wavelength(s). For example, $100 notes would emit with a first characteristic optical signature, while $50 notes would emit with a second characteristic optical signature. The characteristic emission lines may be more narrowly spaced than shown in FIG. 6. By example, in that the emission lines of individual ones of the fibers are of the order of 4 nm, one or more further emission wavelengths can be spaced apart at about 6 nm intervals.

It is also within the scope of the invention to provide a single fiber with two dyes, where the emission from one dye is used to excite the other dye, and wherein only the emission from the second dye may be visible.

In one embodiment Rhodamine 640 is excited at 532 nm. The Rhodamine 640 emits 620 nm radiation with is absorbed by Nile Blue, which in turn emits at 700 nm.

Figure 4:
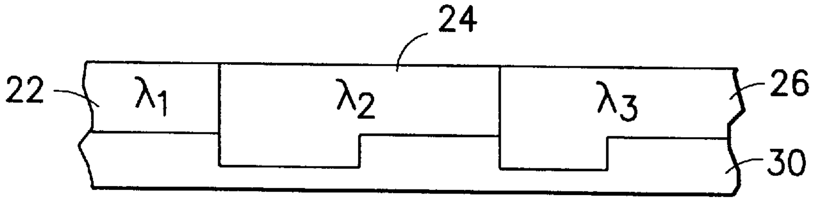
FIG. 4 is an enlarged, cross-sectional view of an other embodiment of the structure of FIG. 3.

FIG. 4 illustrates an embodiment wherein the polymer substrate 28 of FIG. 3 is removed, and the regions 22, 24 and 26 are disposed directly over the patterned metal or other material reflector layer 30. In this embodiment it can be appreciated that a thickness modulation of the gain medium/scatterer regions occurs.

Figure 8:
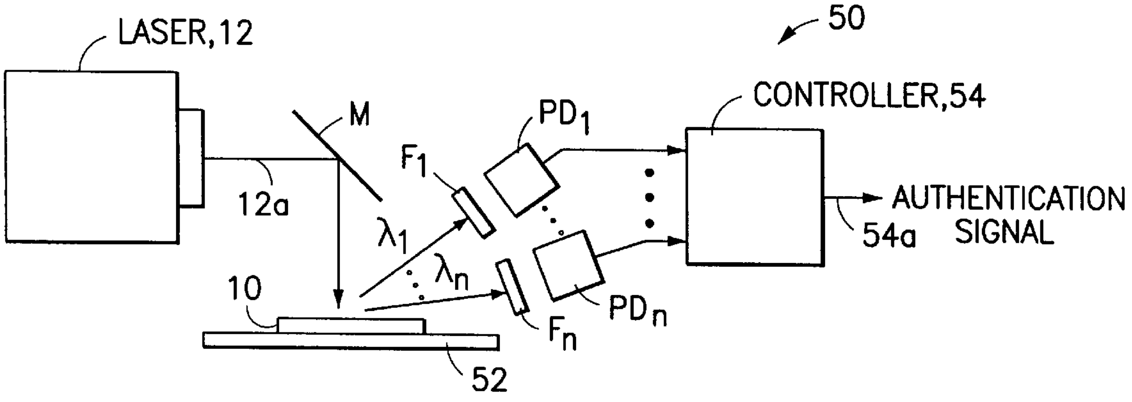
FIG. 8 is a simplified block diagram of a document authentication system that is an aspect of this invention.

FIG. 8 illustrates an embodiment of a suitable apparatus for authenticating a document in accordance with this invention. The authentication system 50 includes the laser 12, such as but not limited to a frequency doubled Nd:YAG laser, that has a pulsed output beam 12*a*. Beam 12*a* is directed to a mirror M and thence to the document 10 to be authenticated. The document 10 is disposed on a support 52.

One or both of the mirror M and support 52 may be capable of movement, enabling the beam 12*a* to be scanned over the document 10. Assuming that the document 10 includes the threads 12, and/or the ink illustrated in FIGS. 2 and 5, one or more emission wavelengths (e.g., $\lambda_1$ to $\lambda_n$) are generated. A suitable passband filter F is provided for each emission wavelength of interest (e.g., F1 to Fn). The output of each filter F1–Fn is optically coupled through free space or through an optical fiber to a corresponding photodetector PD1 to PDn. The electrical outputs of PD1 to PDn are connected to a controller 54 having an output 54*a* for indicating whether the document 10 is authentic. The document 10 is declared to be authentic only when all of the expected emission wavelengths are found to be present, i.e., only when PD1 to PDn each output an electrical signal that exceeds some predetermined threshold. A further consideration can be an expected intensity of the detected wavelength(s) and/or a ratio of intensities of individual wavelengths one to another.

It should be realized that the support 52 could be a conveyor belt that conveys documents past the stationary or scanned beam 12*a*. It should further be realized that a prism or grating could replace the individual filters F1–Fn, in which case the photodetectors PD1–PDn are spatially located so as to intercept the specific wavelength outputs of the prism or grating. The photodetectors PD1–PDn could also be replaced by one or more area imaging arrays, such as a silicon or CCD imaging array. In this case it is expected that the array will be illuminated at certain predetermined pixel locations if all of the expected emission wavelengths are present. It is assumed that the photodetector(s) or imaging array(s) exhibit a suitable electrical response to the wavelength or wavelengths of interest. However, and as was noted above, it is possible to closely space the emission wavelengths (e.g., the emission wavelengths can be spaced about 6 nm apart). This enables a plurality of emission wavelengths to be located within the maximum responsivity wavelength range of the selected detector(s).

The controller 54 can be connected to the laser 12, mirror M, support 52, and other system components, such as a rotatable wedge that replaces the fixed filters F1–Fn, for controlling the operation of these various system components.

Figure 9:
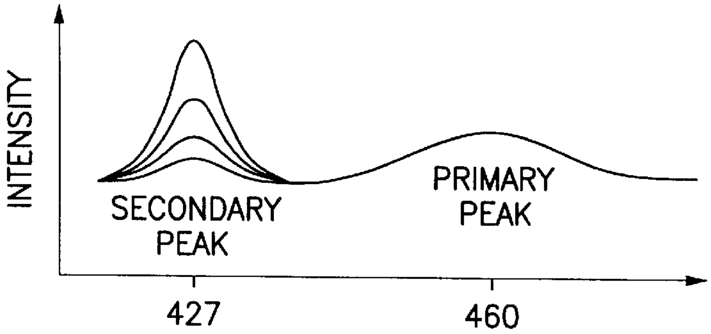
FIG. 9 illustrates an increase in a secondary emission peak that results from a photoconversion of a primary emission peak of certain types of dyes.

Further in accordance with this invention the selected dye can be of a type that exhibits a dual emission under some circumstances, wherein optically conditioning the dye causes a shift or photoconversion from one emission peak to another. Coumarin 460 is one such dye. In methanol-based systems, Coumarin 460 exhibits only a single emission peak at 460 nm. However, and referring to FIG. 9, if placed on or in a solid, such as a water based polymer, in addition to the primary 460 nm peak (about 25 nm in width) a secondary, narrower (about 5 nm) emission peak at 427 nm can also be observed. Initially, the secondary peak is of low intensity. The secondary peak at 427 nm gradually increases in intensity as the dye is repetitively excited at a wavelength corresponding to the primary emission peak. In other words, some of the energy of the primary emission peak is photoconverted to the energy of the secondary emission peak. Other dyes that behave in this fashion include xanthene dyes, such as Rhodamine 640, Coumarin, and Stilbene.

This feature can be employed to advantage in several ways. First, the document can be preconditioned before release so as to set the secondary peak at some predetermined level. In this case the criterion for authenticity is not the presence of only the primary peak of the selected dye, but the presence of the secondary peak either alone or in combination with the primary peak. Thus, even if a forger were to obtain access to the original substrate material on which the document is printed, unless the secondary peak is raised to some predetermined (and presumably secret) level, the forged document would not pass the authenticity test.

Second, by measuring the intensity of the secondary peak sometime after the document is released, the releasing or some other party is enabled to obtain information about if and how many times the document was authenticated or otherwise examined, such as in an authentication system similar to that shown in FIG. 8. As but one example, assume that a party issues a negotiable financial instrument that is expected to be authenticated before it is honored. Further assume that when the instrument is returned to the issuing party that the secondary peak is measured and found to be still at its original level. This may indicate to the issuing party that the instrument was not properly authenticated before it was honored.

Figure 10:
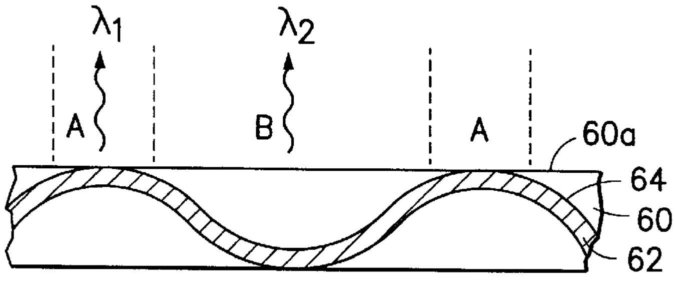
FIG. 10 is an enlarged, cross-sectional view of a paper substrate that includes a windowed security thread in accordance with this invention.

FIG. 10 is an enlarged, cross-sectional view of a paper substrate that includes a windowed security thread in accordance with this invention. A paper substrate 60 has an embedded metal foil or metalized polyester structure 62 having at least one surface coated with a varnish or other suitable coating material 64 that includes the gain medium in combination with scatterers for providing the laser-like emission in response to illumination. In this case the scatterers may be the paper matrix 60 or some additive, such as $TiO_2$. It can be seen that foil is disposed in such a manner that the coated surface varies its location with respect to the upper surface 60*a* of the substrate 60. In accordance with this aspect of the invention, in response to a pump wavelength the emission wavelength will vary between the regions designated A and B. That is, the emission wavelength is a function of the presence and thickness of the paper substrate that overlies the coated surface 64, and the resulting differences in scattering lengths provided by the different thicknesses of the paper substrate. A wavelength shift of from one to several nanometers can be obtained by variations in scattering lengths of about two.

Further in accordance with this invention the paper substrate may be treated with a FWA, such as one of those discussed above. In this case reading at B with UV light yields an emission wavelength in the blue region, while reading at A with visible or UV light yields a visible laser-like emission from the gain medium on the surface 64. In this case the security thread is capable of multiple emissions, and provides enhanced authentication capabilities.

The teaching of this invention generally encompasses the use of security threads, which are considered to be a multi-component material, fibers, such as polymer filaments and textile threads, as well as planchettes, which may be disk-like round or polygonal bodies that are placed into the paper or other substrate, and which include a coating having the optical gain medium.

While the invention has been particularly shown and described with respect to preferred embodiments thereof, it will be understood by those skilled in the art that changes in form and details may be made therein without departing from the scope and spirit of the invention.

What is claimed is:

1. A method for authenticating a document, comprising the steps of:

providing a document to be authenticated;

illuminating at least a portion of the document with laser light that exceeds a threshold fluence;

detecting a narrow band substantially non-saturable amplified spontaneous emission of at least one wavelength from the document in response to the step of illuminating; and declaring the document to be authentic only if the emission is detected.

2. A method as in claim 1, wherein step of providing a document provides a document having embedded threads, individual ones of which comprise a substrate material and an optical gain medium in combination with scatterers for providing the emission in response to the step of illuminating.

3. A method as in claim 1, wherein step of providing a document provides a document having an ink bearing surface, the ink including an optical gain medium in combination with scatterers for providing the emission in response to the step of illuminating.

4. A method as in claim 1, wherein step of providing a document provides a document having a fluorescent whitening agent (FWA), the FWA functioning as an optical gain medium in combination with scatterers for providing the emission in response to the step of illuminating.

5. A method as in claim 1, wherein step of providing a document provides a document having embedded threads, individual ones of said threads being coated with a polymer-based coating, the polymer-based coating functioning as an optical gain medium in combination with scatterers for providing the emission in response to the step of illuminating.

6. A method as in claim 1, wherein step of providing a document provides a document having embedded threads, each of the threads being comprised of N filaments individual ones of which comprise a substrate material and an optical gain medium in combination with scatterers for providing the emission in response to the step of illuminating, wherein each thread emits light at N distinguishable wavelengths.

7. A method as in claim 1, wherein step of providing a document provides a document having embedded threads, each of the threads being comprised of a multilayered structure having a least one layer comprised of the optical gain material, and an underlying metalization layer.

8. A method as in claim 7, wherein the at least one layer of optical gain material is differentiated into a plurality of regions, each of the regions emitting with a characteristic wavelength.

9. A method as in claim 7, wherein the underlying metalization layer is patterned.

10. A method as in claim 7, wherein the underlying metalization layer is patterned and modulates a thickness of an overlying layer comprised of the optical gain material.

11. A method as set forth in claim 1, wherein the step of detecting detects a presence of a secondary emission peak that results from a photoconversion of a primary emission peak.

12. A document, comprising:

a matrix formed as a planar substrate; and at least one security structure embedded in said matrix, said at lest one security structure comprising an optical gain medium that is responsive to illumination with laser light that exceeds a threshold fluence for emitting a narrow band substantially non-saturable amplified spontaneous emission of at least one wavelength.

13. A document as in claim 12, wherein said security structure is comprised of a metalized substrate having a coating comprised of said gain medium on at least one surface.

14. A document as in claim 12, wherein said security structure is comprised of one or more filaments that include said gain medium.

15. A document as in claim 12, wherein said security structure is comprised of a planchette that includes said gain medium.

16. A document as in claim 12, wherein said security structure is comprised of a metalized substrate having a coating comprised of said optical gain medium on at least one surface, said metalized substrate being disposed such that a distance from said at least one surface to an illuminated surface of said planar substrate varies along a length of said metalized substrate.

17. Apparatus for authenticating a document, comprising:

a laser for illuminating all or a portion of a document, said laser outputting light having wavelengths that are predetermined to generate a narrow band substantially non-saturable amplified spontaneous emission, having at least one predetermined emission wavelength, from the document or a structure contained within the document;

at least one photodetector responsive to said predetermined emission wavelength for detecting the presence of the at least one predetermined emission wavelength; and decision means, having an input coupled to an output of said at least one photodetector, for indicating the authenticity of the document based at least in part on a detection of the at least one predetermined emission wavelength.

18. Apparatus as in claim 17, wherein said structure is comprised of an embedded security thread comprised of a substrate material and an optical gain medium in combination with scatterers for providing the emission.

19. Apparatus as in claim 17, wherein the document has an ink bearing surface, the ink including an optical gain medium in combination with scatterers for providing the emission.

20. Apparatus as in claim 17, wherein the document has a fluorescent whitening agent (FWA), the FWA functioning as an optical gain medium in combination with scatterers for providing the emission.

21. Apparatus as in claim 17, wherein said structure is comprised of an embedded security thread coated with a polymer-based coating, the polymer-based coating functioning as an optical gain medium in combination with scatterers for providing the emission.

22. Apparatus as in claim 17, wherein said structure is comprised of an embedded security thread comprised of N filaments individual ones of which comprise a substrate material and an optical gain medium in combination with scatterers for providing the emission, wherein each thread emits light at N distinguishable wavelengths.

23. Apparatus as in claim 17, wherein said structure is comprised of an embedded multilayered security thread having at least one layer comprised of an optical gain medium, and an underlying metalization layer.

24. Apparatus as in claim 23, wherein the at least one layer of optical gain material is differentiated into a plurality of regions, each of the regions emitting with a characteristic wavelength.

25. Apparatus as in claim 23, wherein the underlying metalization layer is patterned.

26. Apparatus as in claim 23, wherein the underlying metalization layer is patterned and modulates a thickness of an overlying layer comprised of the optical gain medium.

27. Apparatus as in claim 17, wherein said structure is comprised of a metalized substrate having a coating comprised of an optical gain medium on at least one surface.

28. Apparatus as in claim 17, wherein said structure is comprised of one or more filaments that include an optical gain medium integrally formed therewith or coated thereon.

29. Apparatus as in claim 17, wherein said structure is comprised of a planchette that includes an optical gain medium.

30. Apparatus as in claim 17, wherein said structure is comprised of a metalized substrate having a coating comprised of an optical gain medium on at least one surface, said metalized substrate being disposed such that a distance from said at least one surface to an illuminated surface of said document varies along a length of said metalized substrate.

31. Apparatus for distinguishing a first type of currency having a first monetary value from other types of currency having different monetary values, comprising:

a laser for illuminating all or a portion of a currency of interest, said laser outputting light having wavelengths that are predetermined to generate a narrow band substantially non-saturable amplified spontaneous emission, having at least one predetermined emission wavelength, from the first type of currency or a structure contained within the first type of currency;

at least one photodetector responsive to said predetermined emission wavelength for detecting the presence of the at least one predetermined emission wavelength; and decision means, having an input coupled to an output of said at least one photodetector, for distinguishing the currency has being one of the first type or another type based at least in part on the output of said photodetector.

32. A fiber, said fiber being responsive to incident light having wavelengths selected to generate a narrow band substantially non-saturable amplified spontaneous emission from said fiber, said emission comprising at least one narrow band of emission wavelengths defined at least in part by scattering at boundaries of said fiber.

33. A fiber as in claim 32, wherein said fiber comprises a portion of a document.

34. A fiber as in claim 32, wherein said fiber comprises a portion of a negotiable instrument.

35. A fiber as in claim 32, wherein said fiber comprises a portion of a currency.

36. A fiber as in claim 32, wherein said fiber comprises a portion of an object that represents a unit of monetary value.

37. An object that is responsive to incident light having wavelengths selected to generate a narrow band substantially non-saturable amplified spontaneous emission from said object, said emission comprising at least one narrow band of emission wavelengths defined at least in part by scattering at boundaries of said object.

38. An object as in claim 37, wherein said object comprises a portion of a document.

39. An object as in claim 37, wherein said object comprises a portion of a negotiable instrument.

40. An object as in claim 37, wherein said object comprises a portion of a currency.

41. An object as in claim 37, wherein said object comprises a portion of an object that represents a unit of monetary value.

* * * * *